United States Patent Office 3,751,353
Patented Aug. 7, 1973

3,751,353
PROCESS FOR THE MANUFACTURE OF 2-CHLORETHANEPHOSPHONIC ACID DICHLORIDE
Hans-Jerg Kleiner, Bad Soden, Taunus, and Sigurd Rosinger, Frankfurt am Main, Germany, assignors to Farbwerke Hoechst Aktiengesellschaft vormals Meister Lucius & Bruning, Frankfurt am Main, Germany
No Drawing. Filed Mar. 26, 1971, Ser. No. 128,536
Claims priority, application Germany, Jan. 19, 1971, P 21 02 264.0
Int. Cl. B01j 1/10
U.S. Cl. 204—158 HE                              8 Claims

ABSTRACT OF THE DISCLOSURE

Preparation of 2-chlorethanephosphonic acid dichloride by the reaction of ethanephosphonic acid dichloride with a chlorinating agent in the presence of high-energy rays.

---

The present invention relates to a process for the manufacture of 2-chlorethanephosphonic acid dichloride.

Copending application Ser. No. 128,537, filed Mar. 26 1971, relates to a process for the manufacture of 2-chlorethanephosphonic acid dichloride of the formula $$ClCH_2CH_2POCl_2$$

wherein ethanephosphonic acid dichloride of the formula $$CH_3CH_2POCl_2$$

is reacted with a chlorinating agent.

As the chlorinating agent, elementary chlorine is preferably used. The reaction may be activated by free radical forming substances or by irradiation with light, advantageously ultraviolet light.

Now we have found that the reaction of ethanephosphonic acid dichloride according to the above process can also be activated by high-energy rays. The irradiation is preferably carried out with the use of γ- or X-rays. It is also possible to use accelerated electrons with an energy of about 0.5 to 4 mev. or the nuclear radiation of a nuclear reactor. The radiation dose rate may vary within wide limits from $10^3$ rad/h. to $10^9$ rad/h. When, for example, γ-rays of a cobalt-60-source are used, the dose rate is generally within the range of from $10^3$ rad/h. to $10^7$ rad/h. The total radiation dose is within the range of from $10^3$ rad to $10^7$ rad, preferably from $10^5$ to $10^7$ rad, depending on the desired extent of conversion and the dose rate used.

The reaction may be carried out at a temperature within the range from $-20°$ to $+80°$ C., preferably from $0°$ to $60°$ C. Higher temperatures may be used, but offer no advantage.

When the chlorinating agent is elementary chlorine, the latter is used in such an amount that it is reacted as completely as possible. In the interest of a good utilization of nuclear energy it may be advantageous, however, to use such an amount of chlorine that the waste gas still contains certain amounts of chlorine which may be returned to the reaction zone after separation of the hydrogen chloride formed. The chlorine is therefore advantageously used in an excess of preferably 1.1 to 1.8 times the amount of consumed chlorine.

The reaction zone may be made of any material that is inert under the reaction conditions, for example, glass, steel, nickel or the alloys thereof.

The process of the invention has the special advantage that it can be carried out at low temperatures and thus dispenses with expensive heating means. Moreover, the lower the reaction temperature, the lower is the risk of corrosion and therefore, among other things, also the danger of the reaction products being contaminated.

The following examples serve to illustrate the invention.

EXAMPLE 1

In a cylindrical glass vessel which had a capacity of 250 milliliters and was provided with a fritted gas distribution tube and means for heating and, respectively, cooling, 127 grams of ethanephosphonic acid dichloride were placed and kept at a temperature of $0°$ C. with the help of a thermostat. After rinsing with pure nitrogen, dry chlorine was introduced into the ethanephosphonic acid dichloride at a rate of about 10 grams of chlorine per hour until saturation. The reaction mixture was then irradiated with γ-rays emitted by a cobalt-60-source with a dose rate of $1.0 \cdot 10^6$ rad/h., while continuing the introduction of the gas at the aforesaid rate. After 7 hours of irradiation and a total dose of 7 mrads, the reaction was discontinued. The reaction mixture was then degassed with the help of a water-jet vacuum pump. 138 grams of a product were obtained, which contained 47.5 grams of 2-chlorethanephosphonic acid dichloride and 11.5 grams of 1-chlorethanephosphonic acid dichloride in addition to unreacted starting product, as determined by NMR (nuclear magnetic resonance)-spectrum. With a total degree of chlorination of about 38%, the chlorinated ethanephosphonic acid dichloride contained 80.5% of 2-chlorethanephosphonic acid dichloride.

EXAMPLE 2

In the apparatus described in Example 1, 60 grams of chlorine were introduced at $+10°$ C. within 2 hours into 132 grams of ethanephosphonic acid dichloride after rinsing with nitrogen. During the introduction, the reaction mixture was irradiated with γ-rays emitted by a cobalt-60-source with a dose rate of $1.0 \cdot 10^6$ rad/h. and a total dose of 2 mrads. The reaction mixture was then degassed as described in Example 1.

149 grams of a product were obtained which, according to NHR-analysis, contained 67 grams of 2-chlorethanephosphonic acid dichloride, 11.4 grams of 1-chlorethanephosphonic acid dichloride and 6.8 grams of 2,2-dichlorethanephosphonic acid dichloride in addition to unreacted starting product. With a degree of chlorination of about 51.5%, the chlorinated ethanephosphonic acid dichloride contained 79% of 2-chlorethanephosphonic acid dichloride.

EXAMPLE 3

In the apparatus of Example 1, 25 g./h. of chlorine were introduced at $37°$ C. for 2.2 hours into 150 grams of ethanephosphonic acid dichloride while irradiating with γ-rays emitted by a cobalt-60-source at a dose rate of $3.5 \cdot 10^5$ rad/h. and a total dose of 0.77 mrad. The reaction mixture was then degassed. The residue (171 grams) was distilled. There were obtained 64.5 grams of a first fraction having a boiling point of $35°$ to $55°$ C. at 1.3 mm. Hg and 93 grams of a second fraction having a boiling point of $60°$ to $70°$ C./1.3 mm. Hg. The distillation residue weighed 13.5 grams. According to NMR-analysis, the first fraction contained 50.8 grams of starting product, 6.85 grams of 1-chlorethanephosphonic acid dichloride and 6.85 grams of 2-chlorethanephosphonic acid dichloride. The second fraction contained 5.3 grams of starting product, 6.5 grams of 1-chlorethanephosphonic acid dichloride, 74.5 grams of 2-chlorethanephosphonic acid dichloride and 6.7 grams of 2,2-dichlorethanephosphonic acid dichloride. By carrying out the reaction in this manner, a total degree of chlorination of about 55% was obtained. The total of chlorinated ethanephosphonic acid dichloride contained about 80% of 2-chlorethanephosphonic acid dichloride.

EXAMPLE 4

In the apparatus of Example 1, 150 grams of ethanephosphonic acid dichloride were chlorinated at 60° C. by introducing 15 g./h. of chlorine for 3.25 hours while irradiating with γ-rays emitted by a cobalt-60-source at a dose rate of $3.6 \cdot 10^5$ rad/h. and a total dose of 1.2 mrads. The reaction product obtained after degassing (167.5 grams) was distilled. There were obtained 48 grams of a first fraction at 40° C./1.0 mm. Hg and 87 grams of a second fraction at 60° C./1.0 mm. Hg. According to NMR-analysis, the first fraction contained 75 mol percent of starting product, 13 mol percent of 1-chlorethanephosphonic acid dichloride and 12 mol percent of 2-chlorethanephosphonic acid dichloride. The second fraction contained 11 mol percent of starting product, 9 mol percent of 1-chlorethanephosphonic acid dichloride, 74 mol percent of 2-chlorethanephosphonic acid dichloride and 6 mol percent of 2,2-dichlorethanephosphonic acid dichloride.

By carrying out the reaction in this manner, a total degree of chlorination of about 50% was obtained. The total of chlorinated ethanephosphonic acid dichloride contained about 75% of 2-chlorethanephosphonic acid dichloride.

What is claimed is:

1. A process for the selective manufacturing of 2-chlorethanephosphonic acid dichloride of the formula $$ClCH_2CH_2POCl_2$$

which comprises reacting ethanephosphonic acid dichloride of the formula $$CH_3CH_2POCl_2$$

with a chlorinating agent at a temperature from —20° C. to 80° C. in the presence of high energy rays.

2. The process of claim 1 wherein γ-rays are used as high energy rays.

3. The process of claim 1 wherein X-rays are used as high energy rays.

4. The process of claim 1 wherein accelerated electrons having an energy within the range from 0.5 to 4 mev. are used as high energy rays.

5. The process of claim 1 wherein the nuclear radiation of a nuclear reactor is used as high energy rays.

6. The process of claim 1 wherein the reaction is carried out at a dose rate within the range of from about $10^3$ to $10^9$ rad/h.

7. The process of claim 1 wherein the reaction is carried out at a dose rate within the range of from about $10^3$ to $10^7$ rad/h.

8. The process of claim 1 wherein a total dose within the range from about $10^5$ to $10^7$ rad is used for the reaction.

References Cited
UNITED STATES PATENTS
2,834,804    5/1958    Lecher et al. ____ 204—158 HA

OTHER REFERENCES
Bourne et al., Chemistry & Industry, No. 46, Nov. 24, 1956, p. 1374.

HOWARD S. WILLIAMS, Primary Examiner